C. D. HINMAN, M. & W. W. LADD.
SLEDS.

No. 194,600. Patented Aug. 28, 1877.

UNITED STATES PATENT OFFICE.

CHARLES D. HINMAN, MOSES LADD, AND WILLIAM W. LADD, OF ST. JOHNSBURY, VERMONT.

IMPROVEMENT IN SLEDS.

Specification forming part of Letters Patent No. 194,600, dated August 28, 1877; application filed June 18, 1877.

*To all whom it may concern:*

Figure 1:
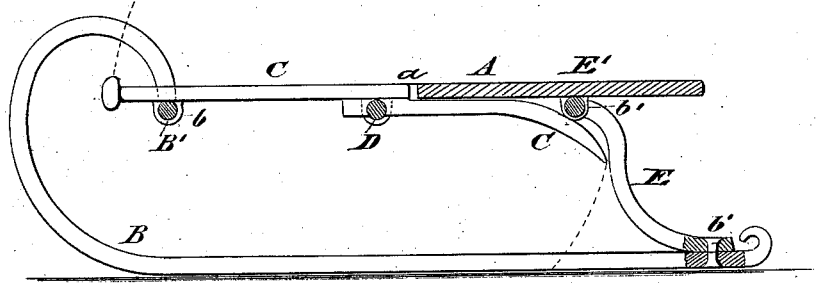
Figure 2:
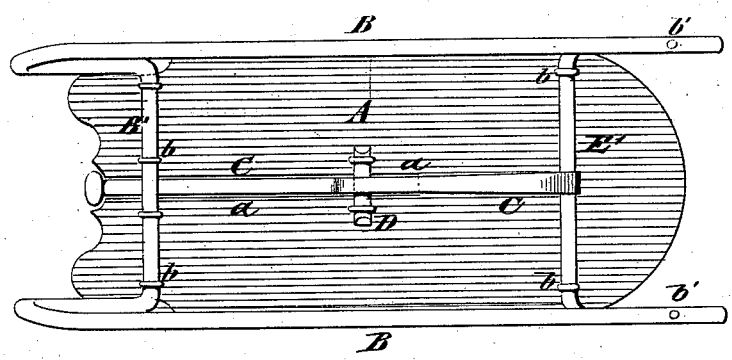

Be it known that we, C. D. HINMAN, M. LADD, and W. W. LADD, of St. Johnsbury, in the county of Caledonia and State of Vermont, have invented a new and Improved Sled, of which the following is a specification:

In the accompanying drawing, Figure 1 represents a vertical longitudinal section of our improved sled, and Fig. 2 a bottom view of the same.

Similar letters of reference indicate corresponding parts.

This invention has reference to an improved sled for coasting purposes, the same being provided with a simple and effective brake device.

The invention will first be described in connection with the drawing, and then pointed out in the claim.

In the drawing, A represents the seat, and B the runners, of our improved sled, the runners being made of one continuous piece of rod-iron, curved upward at the front, then back, and across the under side of the seat A, the lateral cross-piece B′ being securely attached to the seat by staples $b$. The rear ends of the runners are riveted to the ends of stays E, which are made in one piece with the cross-piece E′, that is attached by staples $b'$ to the rear part of the seat.

A brake-lever, C, is fulcrumed to a cross-pivot, D, secured by side staples to the seat, and provided with a wider bent and tapering rear end, for biting with considerable force on the ground, and producing thereby an effective brake action.

The front part of the brake-lever swings in a central longitudinal slot, $a$, of the seat, and terminates with a button, to which the cord for pulling the sled may be attached, and which increases the weight of the front part of the brake-lever C, so that it overbalances the rear part, and rests on the front cross-brace when not in use.

When the brake is used the front part is raised, so that the rear end forms contact with the ground, the brake-action being the stronger the more the lever is forced back.

Thus a strong and neat sled for coasting purposes is provided, which is fully within control of the rider by the brake arrangement.

Having thus described our invention, we claim as new and desire to secure by Letters Patent—

A sled-brake consisting of two pieces end lapped over an intermediate pivot under the seat, one part folding in a front slot of the seat and the other under the rear of seat, as shown and described.

CHARLES D. HINMAN.
MOSES LADD.
WILLIAM WALLACE LADD.

Witnesses:
ORANGE K. LADD,
JAS. M. WARNER.